US011782991B2

(12) United States Patent
Ma et al.

(10) Patent No.: US 11,782,991 B2
(45) Date of Patent: *Oct. 10, 2023

(54) ACCELERATED LARGE-SCALE SIMILARITY CALCULATION

(71) Applicant: Google LLC, Mountain View, CA (US)

(72) Inventors: Lin Ma, San Jose, CA (US); Nathan Wiegand, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,116

(22) Filed: Jun. 13, 2022

(65) Prior Publication Data

US 2022/0309101 A1 Sep. 29, 2022

Related U.S. Application Data

(62) Division of application No. 16/344,450, filed as application No. PCT/US2018/030486 on May 1, 2018, now Pat. No. 11,379,535.

(51) Int. Cl.
*G06F 7/00* (2006.01)
*G06F 16/906* (2019.01)
*G06F 12/0802* (2016.01)

(52) U.S. Cl.
CPC ........ *G06F 16/906* (2019.01); *G06F 12/0802* (2013.01)

(58) Field of Classification Search
CPC .... G06F 16/906; G06F 12/0802; G06F 17/10; G06F 17/15; G06F 17/18
See application file for complete search history.

(56) References Cited

U.S. PATENT DOCUMENTS

| 4,905,162 A | 2/1990 | Hartzband et al. |
| 5,339,257 A | 8/1994 | Layden et al. |

(Continued)

FOREIGN PATENT DOCUMENTS

| JP | H08-077177 | 3/1996 |
| JP | H08-272824 | 10/1996 |

(Continued)

OTHER PUBLICATIONS

Fast Parallel Set Similarity Joins on Many-core Architectures; Sidney Ribeiro-Junior, Rafael David Quirino, Leonardo Andrade Ribeiro, Wellington Santos Martins Universidade Federal de Goias, Brazil; Dec. 2001 (Year: 2001).*

(Continued)

*Primary Examiner* — Mohammed R Uddin
(74) *Attorney, Agent, or Firm* — Fish & Richardson P.C.

(57) ABSTRACT

Methods, systems, and apparatus, including computer programs encoded on a computer storage medium, for obtaining data stored at a storage device using a first processor of an entity correlation system. The data includes information about multiple entities. The first processor generates data arrays using the obtained data. Each data array includes parameter values for multiple entities and is configured for processing at a respective computing cell of a second processor. The system provides the data arrays to the second processor. The second processor is configured to execute a correlation algorithm to concurrently process the data arrays at the respective computing cells. The second processor computes a correlation score based on calculations performed at the cells using the algorithm and the parameter values. The system determines relationships among entities of the data arrays based on the correlation score. The relationships indicate overlapping attributes or similarities that exist among subsets of entities.

20 Claims, 5 Drawing Sheets

(56) References Cited

U.S. PATENT DOCUMENTS

| | | |
|---|---|---|
| 5,560,006 A | 9/1996 | Layden et al. |
| 5,943,663 A | 8/1999 | Mouradian |
| 6,427,141 B1 | 7/2002 | Barnhill |
| 6,774,917 B1 | 8/2004 | Foote et al. |
| 6,778,981 B2 | 8/2004 | Lee et al. |
| 6,947,933 B2 | 9/2005 | Smolsky |
| 7,069,268 B1 | 6/2006 | Burns et al. |
| 7,716,217 B2 | 5/2010 | Marston et al. |
| 7,899,796 B1 | 3/2011 | Borthwich et al. |
| 8,099,401 B1 | 1/2012 | Hsu et al. |
| 8,166,047 B1 | 4/2012 | Cohen et al. |
| 8,407,215 B2 | 3/2013 | Sheedy et al. |
| 8,620,930 B2 | 12/2013 | Gulhane et al. |
| 9,396,253 B2 | 7/2016 | Porpora et al. |
| 9,413,527 B2 | 8/2016 | Yang et al. |
| 10,268,749 B1 | 4/2019 | Roy et al. |
| 10,565,498 B1 | 2/2020 | Zhiyanov |
| 10,635,739 B1 | 4/2020 | Bartruni |
| 2002/0059260 A1 | 5/2002 | Jas |
| 2004/0002818 A1 | 1/2004 | Kulp et al. |
| 2004/0193582 A1* | 9/2004 | Smyth ............... G06F 16/2458 |
| 2004/0197013 A1 | 10/2004 | Kamei |
| 2005/0190189 A1 | 9/2005 | Chefd'hotel et al. |
| 2005/0246333 A1 | 11/2005 | Hou et al. |
| 2005/0271302 A1 | 12/2005 | Khamene et al. |
| 2009/0018996 A1 | 1/2009 | Hunt et al. |
| 2009/0192980 A1 | 7/2009 | Beyer et al. |
| 2009/0319513 A1 | 12/2009 | Terao et al. |
| 2010/0223266 A1 | 9/2010 | Balmin et al. |
| 2011/0208681 A1 | 8/2011 | Kuecuekyan |
| 2012/0321175 A1 | 12/2012 | Hedau et al. |
| 2012/0324204 A1 | 12/2012 | Inoue |
| 2013/0006988 A1 | 1/2013 | Li et al. |
| 2013/0066860 A1 | 3/2013 | Kilpinen et al. |
| 2013/0253367 A1 | 9/2013 | Newman et al. |
| 2014/0079297 A1 | 3/2014 | Tadayon et al. |
| 2014/0122586 A1 | 3/2014 | Kao et al. |
| 2014/0101186 A1 | 4/2014 | Lau et al. |
| 2014/0201126 A1 | 7/2014 | Zadeh et al. |
| 2014/0304505 A1 | 10/2014 | Dawson |
| 2015/0095333 A1 | 4/2015 | Porpora et al. |
| 2015/0120714 A1 | 4/2015 | Xu et al. |
| 2015/0363553 A1 | 12/2015 | Rustgi et al. |
| 2016/0239499 A1 | 8/2016 | Nguyen et al. |
| 2017/0161591 A1 | 6/2017 | English et al. |
| 2017/0193390 A1 | 7/2017 | Weston et al. |
| 2017/0220607 A1 | 8/2017 | Sweeney et al. |
| 2017/0286489 A1 | 10/2017 | Dantressangle et al. |
| 2017/0371881 A1 | 12/2017 | Reynolds et al. |
| 2018/0040073 A1 | 2/2018 | Ghosh et al. |
| 2018/0075571 A1 | 3/2018 | Zhou et al. |
| 2018/0181705 A1 | 6/2018 | Kilpinen et al. |
| 2018/0189444 A1 | 7/2018 | Van Rooyen et al. |
| 2019/0005407 A1* | 1/2019 | Harris ............... G06N 7/005 |
| 2019/0078142 A1 | 3/2019 | Apte et al. |
| 2019/0095472 A1 | 3/2019 | Griffith |
| 2019/0317961 A1 | 10/2019 | Brener et al. |

FOREIGN PATENT DOCUMENTS

| | | |
|---|---|---|
| JP | 4976578 | 7/2012 |
| JP | 2014-523015 | 9/2014 |
| JP | 2017-079080 | 4/2017 |
| WO | WO 2019212537 | 11/2019 |

OTHER PUBLICATIONS

International Preliminary Report on Patentability in International Appln. No. PCT/US2018/030486, dated Nov. 3, 2020, 1 page.

International Written Opinion and Search Report in International Appln. No. PCT/US2018/030486, dated Jan. 30, 2019, 17 pages.

Matsumoto et al., "Accelerating Exact Similarity Search on CPU-GPU Systems," 2015 IEEE International Conference on Data Mining, Nov. 2015, 10 pages.

Office Action in Indian Appln. No. 201927053704, dated Jun. 2, 2021, 8 pages (with English translation).

Office Action in Japanese Appln. No. 2020-560917, dated Aug. 1, 2022, 6 pages (with English translation).

Office Action in Japanese Appln. No. 2020-560917, dated Jan. 11, 2022, 7 pages (with English translation).

Ribeiro-Junior et al., "Fast parallel set similarity joins on many-core architectures." Journal of Information and Data Management 8.3, Dec. 2017, 255-255.

Selvaluxmiy et al., "Accelerating k-NN classification algorithm using graphics processing units," 2016 IEEE International Conference on Information and Automation for Sustainability, Dec. 2016, 6 pages.

Sugano et al., "Accelerating large-scale set similarity join using many-core processor," The 10th Forum on Data Engineering and Information Management, Mar. 6, 2018, 13 pages (with English translation).

Tabei et al., "Single versus Multiple Sorting in All Pairs Similarity" JMLR: Workshop and Conference Proceedings, Nov. 2010, 16 pages.

Tsuda et al., "Similarity search for large-scale data," Journal of the Japanese Society for Artificial Intelligence, The Japanese Society for Artificial Intelligence, May 1, 2012, 27(3), 239-245.

Wang et al., "FLASH: Randomized Algorithms Accelerated over CPU-GPU for Ultra-High Dimensional Similarity Search," arXiv, Sep. 2017, 15 pages.

Wang, "Next Generation Outlier Detection," Thesis for the degree of Doctor of Philosophy, The Ohio State University, Jan. 2014, 188 pages.

Notice of Allowance in Japanese Appln. No. 2020-560917, dated Dec. 19, 2022, 5 pages (with English translation).

Notice of Allowance in Korean Appln. No. 10-2020-7033966, dated Jan. 17, 2023, 3 pages (with English translation).

Office Action in Chinese Appln. No. 201880048473.5, dated Feb. 2, 2023, 25 pages (with English translation).

* cited by examiner

ACCELERATED LARGE-SCALE SIMILARITY CALCULATION

CROSS-REFERENCE TO RELATED APPLICATIONS

This application is a divisional application of, and claims priority to, U.S. patent application Ser. No. 16/344,450, filed Apr. 24, 2019, which is a national stage application under § 371 and which claims priority to International Application No. PCT/US2018/030486, filed May 1, 2018. The disclosures of the prior applications are considered part of and are incorporated by reference in the disclosure of this application.

BACKGROUND

This specification relates to computing processes for large-scale similarity calculations.

In many cases it may be desired to determine whether, or how well, an input sample matches multiple stored records. As one example, it may be desired to determine whether a DNA sample matches any of the records stored in a database of DNA records. The database is likely to contain many DNA records (for example hundreds of thousands or even millions of records). In general, it may be desired to retrieve some number n of stored records from the database in response to an input sample. The input sample can be the n records in the database that are determined to be the n closest matches to the input sample. The number n of retrieved records is smaller, typically much smaller, than the overall number of records in the database. The n retrieved records may be arranged in the order of most probable first. Conventionally, such a retrieval process can involve calculating a measure of similarity between the input sample and every record stored in the database, and then identifying the n records with the highest values of calculated similarity measure. The n retrieved records may be re-ordered so as to be arranged with reference to the value of calculated similarity measure. As the number of stored records increases, this process becomes increasingly computationally intensive and time consuming.

SUMMARY

Methods, systems, and apparatus, including computer programs encoded on a computer storage medium, for obtaining data stored at a storage device using a first processor of an entity correlation system. The data includes information about multiple entities. The first processor generates data arrays using the obtained data. Each data array includes parameter values for multiple entities and is configured for processing at a respective computing cell of a second processor. The system provides the data arrays to the second processor. The second processor is configured to execute a correlation algorithm to concurrently process the data arrays at the respective computing cells. The second processor computes a correlation score based on calculations performed at the cells using the algorithm and the parameter values. The system determines relationships among entities of the data arrays based on the correlation score. The relationships indicate overlapping attributes that exist among subsets of entities.

One aspect of the subject matter described in this specification can be embodied in a computer-implemented method. The method includes, obtaining, by a first processing unit of an entity correlation system, data stored at a storage device, the data comprising information about multiple entities; and generating, at the first processing unit, multiple data arrays using the data obtained from the data storage device. Each data array of the multiple data arrays: i) includes parameter values for multiple entities; and ii) is configured for processing at a respective computing cell of a second processing unit. The method includes providing, at the entity correlation system, at least two data arrays to the second processing unit, the second processing unit being configured to execute a correlation algorithm to concurrently process the at least two data arrays at respective computing cells of the second processing unit; computing, at the second processing unit, a correlation score based on calculations performed at the respective computing cells using the correlation algorithm and the parameter values for the multiple entities; and determining, at the entity correlation system, relationships among entities of the at least two data arrays based on the computed correlation score, wherein the relationships indicate overlapping attributes that exist among at least a subset of the entities.

These and other implementations can each optionally include one or more of the following features. For example, in some implementations, computing the correlation score comprises: selecting the particular correlation algorithm as a similarity algorithm or a conditional probability algorithm; calculating, using the particular correlation algorithm, an intersection between entities of the at least two data arrays and a union between entities of the at least two data arrays; and computing the correlation score based on the intersection and the union. In some implementations, the first processing unit is a central processing unit (CPU) that pre-sorts data obtained from the data storage device to generate the multiple data arrays; the second processing unit is a graphics processing unit (GPU) that performs parallel calculations using the parameter values for entities of the at least two data arrays; and the particular correlation algorithm is a jaccard similarity algorithm, a cosine similarity algorithm, or a conditional probability algorithm.

In some implementations, generating comprises: sorting, based on a sketching algorithm, the data comprising information about the multiple entities; and in response to sorting, generating a sketch representation of the data, each sketch representation corresponding to each of the multiple data arrays. In some implementations, each data array is a sketch representation of the data stored at the storage device; and at least a subset of the multiple data arrays comprises respective data arrays that each have a predetermined number of entities. In some implementations, each sketch representation is sized according to a quantity of computing cells that are included at the second processing unit. In some implementations, providing includes: storing each data array at a memory cache of the second processing unit, wherein the memory cache represents a compact memory of the second processing unit and each data array is sized according to the data capacity of the compact memory.

In some implementations, at least one of the data arrays is configured for access by each of multiple computing cells that are included at the second processing unit. In some implementations, determining relationships among entities includes: determining whether the computed correlation scores exceed a threshold score; and in response to determining that the computed correlation scores exceed the threshold score, generating a listing of entities that are ranked using the correlation scores that exceed the threshold score.

Another aspect of the subject matter described in this specification can be embodied in a computer-implemented method. The method includes receiving first data items at a first processing unit (e.g., a CPU); generating, by the first processing unit and from at least the received first data items, data structures, each data structure representing a respective dataset; storing the data structures in a memory of a second processing unit (e.g., a GPU); receiving, at the first processing unit, a query from a user; processing in parallel, by the second processing unit, the query against two or more of the data structures stored at the second processing unit; and returning the results of the processing from the second processing unit to the first processing unit.

These and other implementations can each optionally include one or more of the following features. For example, in some implementations, the second processing unit includes multiple processing cores, and processing, by the second processing unit, the query against the data structures comprises: processing the query in parallel in each processing core against a respective one of the data structures. In some implementations, processing, by the second processing unit, the query against the data structures stored at the second processing unit includes, for a data structure stored at the second processing unit, determining a respective measure of similarity between the data structure and the query. In some implementations, returning the results of the processing from the second processing unit to the first processing unit comprises returning information identifying the data structures that are n best matches to the query.

In some implementations, the method includes the first processing unit generating a query data structure from the received query and sending the query data structure to the GPU; and wherein processing the query by the second processing unit comprises processing the query data structure against the data structures stored at the second processing unit. In some implementations, the data structures and the query data structure are KMV sketches. In some implementations, processing, by the second processing unit, the query against a data structure stored at the second processing unit comprises determining the union of the query data structure and the stored data structure. In some implementations, processing, by the second processing unit, the query against a data structure stored at the second processing unit comprises determining the intersection of the query data structure and the stored data structure. In some implementations, processing, by the second processing unit, the query against a data structure stored at the second processing unit includes determining the Jaccard similarity between the query data structure and the data structure.

In some implementations, receiving the data items at the first processing unit comprises receiving the data items from a data hosting service; wherein receiving the data items at the first processing unit comprises receiving the data items from a data hosting service; and wherein the method further comprises returning the results of the processing from the first processing unit to the data hosting service. In some implementations, the method further includes: receiving, at the first processing unit, a second query; and processing, by the second processing unit, the second query against the data structures stored at the second processing unit.

In some implementations, the method further includes: receiving second data items at the first processing unit; generating, by the first processing unit and from at least the received second data items, updated data structures, each updated data structure representing a respective dataset; and storing the updated data structures in the memory of the second processing unit. In some implementations, the method further includes: receiving, at the first processing unit, a third query; and processing, by the second processing unit, the third query against the updated data structures stored at the second processing unit.

In some implementations, a processing system including a first processing unit in communication with a second processing unit is configured to carry out a method as defined in any one of the preceding paragraphs of this summary. In some implementations, a computer-readable medium contains stored instructions that, when executed by a processing system including a first processing unit in communication with a second processing unit causes the processing system to carry out a method as defined in any one of the preceding paragraphs of this summary.

An aspect of the present disclosure provides a method comprising: receiving first data items at a first processing unit; generating, by the first processing unit and from at least the received first data items, data structures, each data structure representing a respective dataset; storing the data structures in a memory of a second processing unit; receiving, at the first processing unit, a query from a user; processing in parallel, by the second processing unit, the query against two or more of the data structures stored at the second processing unit; and returning the results of the processing from the second processing unit to the first processing unit. In this aspect the first processing unit may be a CPU (central processing unit) and the second processing unit may be a GPU (graphics processing unit).

Particular embodiments of the subject matter described in this specification can be implemented so as to realize one or more of the following advantages. A graphics-processing unit can determine correlation scores, computation results, and/or similarity relationships among entities of pre-sorted data arrays with increased speed relative to other data correlation systems. The graphics processor can perform the necessary calculations associated with executing data correlation algorithms (jaccard similarity algorithms) without sorting/pre-sorting data before executing the correlation algorithm. Additionally, the graphics processor can perform the necessary calculations by engaging little to no inter-thread data communications relative to other correlation systems. This is because each computing cell of the graphics processor performs computations on specific sets of data arrays for each query submitted by a user of the system.

For example, using certain low-cost graphics processors, the described techniques can be implemented to achieve more than 20 million similarity calculations within one second using only a single computing cell of a graphics processor. In some implementations, the one second durations for achieving the at least 20 million similarity calculations is more than 10 times faster than the time required for a standard processor (e.g., a CPU) to perform the same amount of calculations. Hence, the described techniques allow a given processor to process larger data arrays in a given time (or to process a data array of given size in a shorter time) and so effectively provide increased computing power for achieving data correlation calculations relative to other data processing apparatus. Also, the described techniques provide a repeatable automated process that involves minimal human intervention and does not require manual execution of pre-sorting data, generating data arrays, or configuring a size of the data arrays. As such, the techniques enable computing systems to quickly perform operations (e.g., a substantial number of similarity calculations) that the systems were previously unable to automatically perform in a fast manner due to challenges with using a k-min-hash or k-minimum value algorithm for sorting data in a graphics processor/GPU computing environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes techniques for implementing a k-min-hash or k-minimum value ("KMV") data processing algorithm to sort data that is pre-loaded at a graphics processing unit (GPU) to compute relationships between entities. Specifically, the described techniques can be used to accelerate data correlation calculations, e.g., for determining similarities among entities, by storing pre-sorted data on a GPU so that computing cells of the GPU can quickly determine the relationships between the entities. The GPU determines the relationships by executing a particular type of correlation algorithm. The relationships can be computed or determined at the GPU with increased speed relative to current systems because the GPU is no longer required to pre-sort the data prior to executing the correlation algorithm.

For example, an entity correlation system stores large amounts of data that includes information describing different entities. The system can include a central processing unit (CPU) that is configured to obtain data from a data storage device, pre-sort the data, and generate multiple pre-sorted data arrays that each include a predetermined quantity of entities. Pre-sorting the data and generating the data arrays occurs in response to the CPU executing a KMV sketch algorithm to process the obtained data. The data arrays correspond to respective sets of data (or datasets). In general, entities of one dataset can be items, persons, or various electronic and real world objects. For example, entities of one dataset can be persons or users of a particular demographic (e.g., males in their 20's) that reside in a certain geographic region (e.g., the United Kingdom (U.K.)). Similarly, entities of another dataset can be users of another demographic (e.g., the general population) that also reside in the same geographic region.

The system includes a tensor data flow interface that is configured to pre-load at least two data arrays (e.g., tensors) for storage at a memory device of the GPU. In response to the system receiving a user query for information, the GPU efficiently computes correlations (e.g., similarities) among entities in the respective datasets. For example, the query might seek information indicating which domain names 20-year-old males in the U.K. find more interesting relative to the general population in the U.K. The system computes the correlations by executing a specific type of correlation algorithm (e.g., a jaccard similarity algorithm) to calculate correlation scores that characterize relationships between entities of the different datasets. The system uses the correlation scores calculated at the GPU to generate a result set that provides information that is responsive to the received query.

Figure 1:
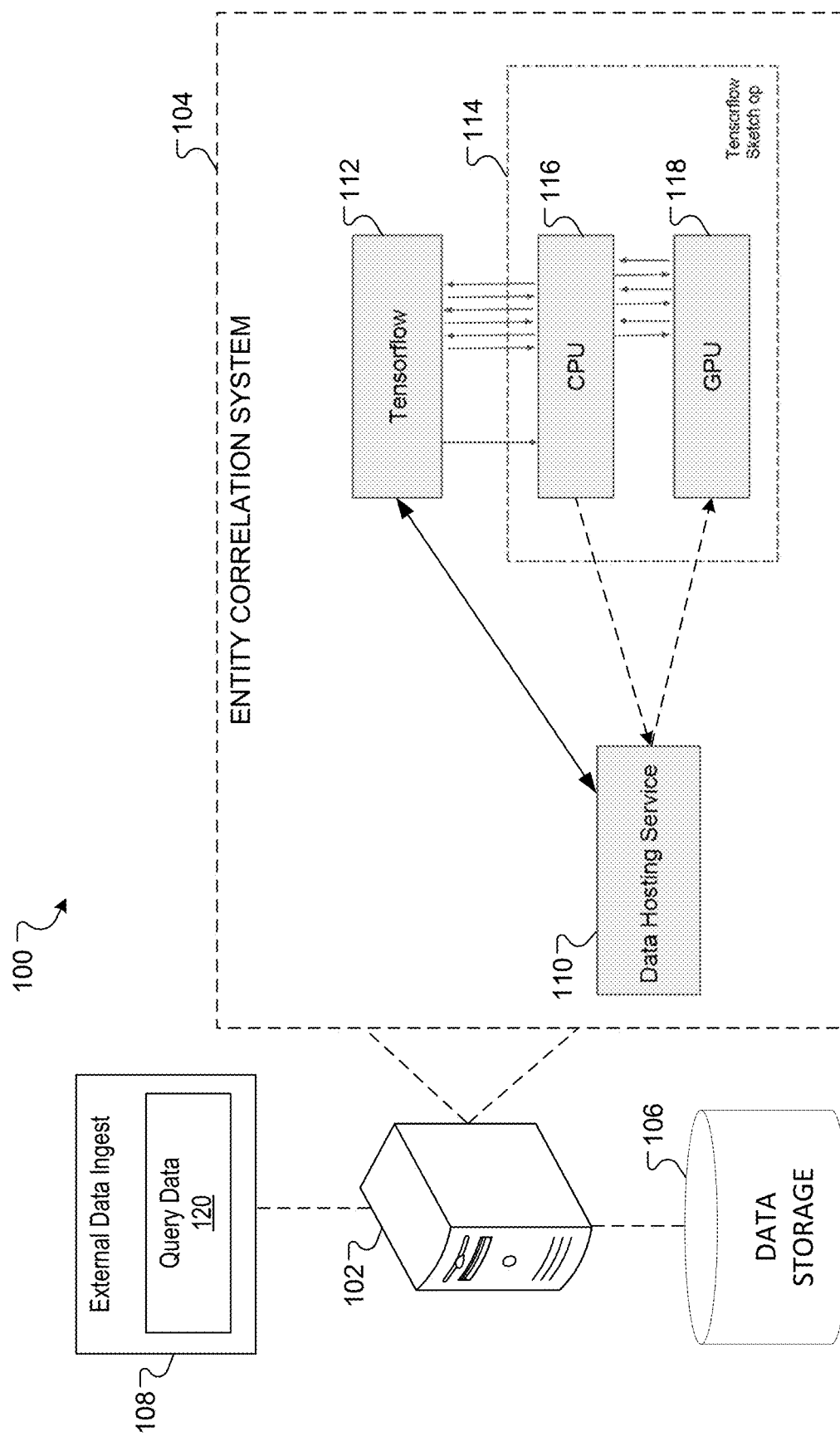
FIG. 1 is a block diagram of an example computing system for determining correlations among entities using processors of the computing system.

FIG. 1 is a block diagram of a computing system 100 for determining correlations among entities using processors of the computing system. System 100 generally includes a computing server 102, an entity correlation system 104, a data storage device 106, and a data ingest component 108. As described in more detail below, system 100 includes special-purpose hardware circuitry configured to execute specific computational rules for implementing k-min-hash or k-minimum value ("KMV") algorithms. Execution of these specific rules enable sorting (e.g., pre-sorting) of large entity datasets and pre-loading of the entity datasets at a particular type of processing unit. The processing unit can be a processor device (e.g., a graphics processing unit (GPU)) configured to compute relationships between entities of the datasets. Specifically, techniques implemented using system 100 are used to accelerate different data correlation calculations, e.g., for determining overlapping attributes and/or similarities among entities.

Referring now to elements of system 100, computing server 102 is configured to use entity correlation system 104 to determine correlations among entities of at least different datasets. In some implementations, entity correlation system 104 is included within server 102 as a sub-system of hardware circuits (e.g., special-purpose circuitry) that includes two or more processor microchips. In general, server 102 can include processors (e.g., CPU and GPU), memory, and data storage devices 106 that collectively form computer systems of server 102. Processors of these computer systems process instructions for execution by server 102, including instructions stored in the memory or on the data storage device 106 to display graphical information for output at an example display monitor of system 100.

In some implementations, execution of the stored instructions cause one or more of the actions described herein to be performed by server 102 or system 104. In other implementations, multiple processors may be used, as appropriate, along with multiple memories and types of memory. For example, server 102 may be connected with multiple other computing devices, with each device (e.g., a server bank, groups of servers, modules, or a multi-processor system) performing portions of the actions, operations, or logical flows described in this specification.

System 104 includes a data hosting service 110, a dataflow module 112, and a processor module 114. Hosting service 110 is configured to interface with processor module 114, using data flow module 112, to provide data for processing at module 114 in response to user interaction at data ingest component 108. In some implementations, hosting service 110 is configured for real-time access to a variety of different data sources for obtaining or receiving different types of data. The obtained data can be provisioned for processing at module 114 using the data flow management features (described below) of data flow module 112. For example, system 104 and hosting service 110 can interact with ingest component 108 to receive query data 120 generated from user interaction at ingest component 108. Similarly, system 104 and hosting service 110 can access storage device 106 to obtain various sets of data (e.g., datasets) for processing at module 114.

Hosting service 110 includes a database of information that corresponds to "sketches." In some implementations, these sketches are generated for storage in the database of hosting service 110 based on analysis and information sorting performed on datasets obtained from storage device 106. The database of hosting service 110 can include a variety of sketches that are grouped, or otherwise characterized, by information type. For example, the database can include sketches of pre-sorted entity data that correspond to different types of user queries, persons or individuals, demographics for different geographic regions, domain names, commercial products, or various digital and real-world items or objects. In some implementations, each sketch stored in the database is identified by a unique type indicator for characterizing information about entities (or queries) that form a sketch. For example, a unique type indicator can identify a sketch as including information for a specific type of entity (e.g., persons, locations, digital assets, or combinations of each) or specific types of queries obtained using query data 120 and that reference entities of a sketch.

As used in this document, a "sketch" is a data array that describes a set of people or a set of things. For example, a sketch can be a set of people living in the U.S. or another set of people living in the U.K. Additionally, or alternatively, a sketch can be a set of persons, digital assets, or identifiers (for example IP addresses that accessed a particular URL (e.g., www.example.com) on a particular day and/or from a particular geographic location). In some implementations, each sketch in a database of multiple sketches can be sets of people (or respective identifiers assigned to people or items) that are grouped via a unique type indicator. For example, a first sketch can include 18-year-olds, where each 18-year-old is a discrete entity, living in a particular city in the U.K. (e.g., London), while a second different sketch can include certain types of online content (e.g., a sponsored content item) that was clicked or interacted with by a user during a certain time-frame.

As described in more detail below, system 104 is configured to generate multiple data arrays using queries identified from query data 120 and datasets obtained from storage device 106. The data arrays are processed at module 114 to generate result sets that are responsive to a query submitted by a user interacting with ingest component 108. In some implementations, the query is a current query that is received in real-time by system 100 via ingest component 108. In some implementations, system 104 determines an entity type associated with the received query, uses the associated entity type to identify at least two data arrays (or sketches) that have been accessed from the database of hosting service 110, and processes the query using the at least two data arrays accessed from the database. In response to processing the query, system 104 generates a result set that is responsive to the query.

Dataflow module 112 can be a computing module configured to provide data flow management functions of system 100. In some implementations, dataflow module 112 is configured to provide an application program interface (API) and a machine-learning (ML) framework. The API and ML framework enable system 100 to use a KMV data processing algorithm to process and sort datasets received at module 114 via hosting service 110. For example, a first processor 116 (e.g., CPU 116) of module 114 can receive datasets for generating pre-sorted data arrays using API features of dataflow module 112. In general, first processor 116 is an example CPU and can be referred to herein as "CPU 116." In some implementations, dataflow module 112 communicates with hosting service 110 to receive or obtain datasets for processing at module 114. As described in more detail below, CPU 116 processes the datasets by a executing a KMV algorithm to generate multiple respective sketches or data arrays that each have a predefined size attribute. Further, a second processor 118 (e.g., GPU 118) of module 114 can receive at least a subset of the multiple data arrays for loading in a memory cache of the second processor 118. In general, second processor 118 is an example GPU and may be referred to herein as "GPU 118."

Using the ML framework of dataflow module 112, system 100 causes GPU 118 to execute an algorithm (e.g., a correlation algorithm) to perform correlation analysis using the data arrays that are loaded at the memory cache of GPU 118. In particular, GPU 118 can be any one of several types of GPUs that are used to execute different types of ML algorithms. In this context, dataflow module 112 is configured such that a specific kernel is provided for interfacing with each of the different types of GPUs that may be included as a processor device of module 114. In some implementations, dataflow module 112 is configured such that designers can generate software instructions and other coded algorithms for execution at the different types of GPUs that may be included at module 114. In some implementations, the algorithms can be executed to perform computations for determining similarities, inferences, probabilities, and correlations relating to entities, or for using statistical analysis to discern relationships among entities of large datasets.

Processor module 114 includes CPU 116 and GPU 118. As indicated above, CPU 116 receives datasets obtained via hosting service 110, executes the KMV data processing algorithm to pre-sort the data, and generates multiple data arrays based on execution of the KMV algorithm (e.g., a sketch algorithm) and the pre-sorted data. Module 114 can be configured to sort entity data in the datasets and generate the data arrays using a batch process that runs or executes at CPU 116 based on predetermined processing schedules (e.g., batch processing once a day). In some implementations, module 114 is configured to generate the pre-sorted data arrays based on analysis of streams of entity data in the datasets obtained via hosting service 110.

Each of the multiple pre-sorted data arrays correspond to respective sketches that each have a predefined size attribute. For example, the predefined size can be set such that each data array includes no more than 64,000 ("64 k") entities. In some implementations, the size attribute can be more than 64 k entities but less than a particular quantity of entities that would exceed a certain memory capacity of GPU 118. In some implementations, the predefined size attribute of the data array is set based on a cache memory capacity of the GPU 118.

GPU 118 receives multiple data arrays or multiple groups of data arrays that are loaded at a memory/storage medium of GPU 118. For example, in a single instance, GPU 118 receives information for multiple entities based on a single data load that occurs at the GPU after CPU 118 generates the data arrays. The data arrays are loaded and stored in an area of GPU memory that can be considered "compact" relative to other memory sections of the GPU. For example, the multiple data arrays may be loaded at the compact cache memory of the GPU based on a predefined size attribute of $64k$ entities per data array. In other words, the data arrays are each configured for storage at the compact cache memory when an information density (e.g., parameter values) for each entity of the $64k$ entities does not exceed a threshold capacity of the compact cache memory. In some implementations, a data array can be represent a tensor and, thus, may be referred to herein as data structures or a query tensor or an entity tensor. In some implementations, a tensor is a geometric object and example geometric objects include matrices and data arrays. An example tensor can be a single dimension geometric object or a multi-dimensional geometric object.

As described in more detail below with reference to FIG. 2 through FIG. 4, for a given query received at system 100, a single data loading operation can be performed such that GPU 118 receives data for generating a response to the query. During the loading operation, GPU 118 can receive at least one data array with information about different entities and that has an entity type indicator which matches a type indicator of the received query. GPU 118 can also receive a query tensor that relates to the received query or that has a threshold amount of relevance to the received query. GPU 118 generates the response to the query using the information obtained during the data loading operation. In some implementations, a batch process runs in which system 104 computes a multitude of sketches for a database of hosting service 110. GPU 118 then loads information or parameter values for each of the multiple sketches or data arrays through the API associated with dataflow module 112. In some implementations, GPU 118 loads this data into its own internal memory from an example impasse database that is accessible via hosting service 110. The impasse database can be associated with an impasse service that communicates with CPU 116 and GPU 118 through a dataflow API to load the data arrays and to issue queries received at ingest component 108. For example, during run time, issued queries are processed against data arrays loaded at GPU 118 using a query path from hosting service 110, through the API of dataflow module 112, to GPU 118.

Figure 2:
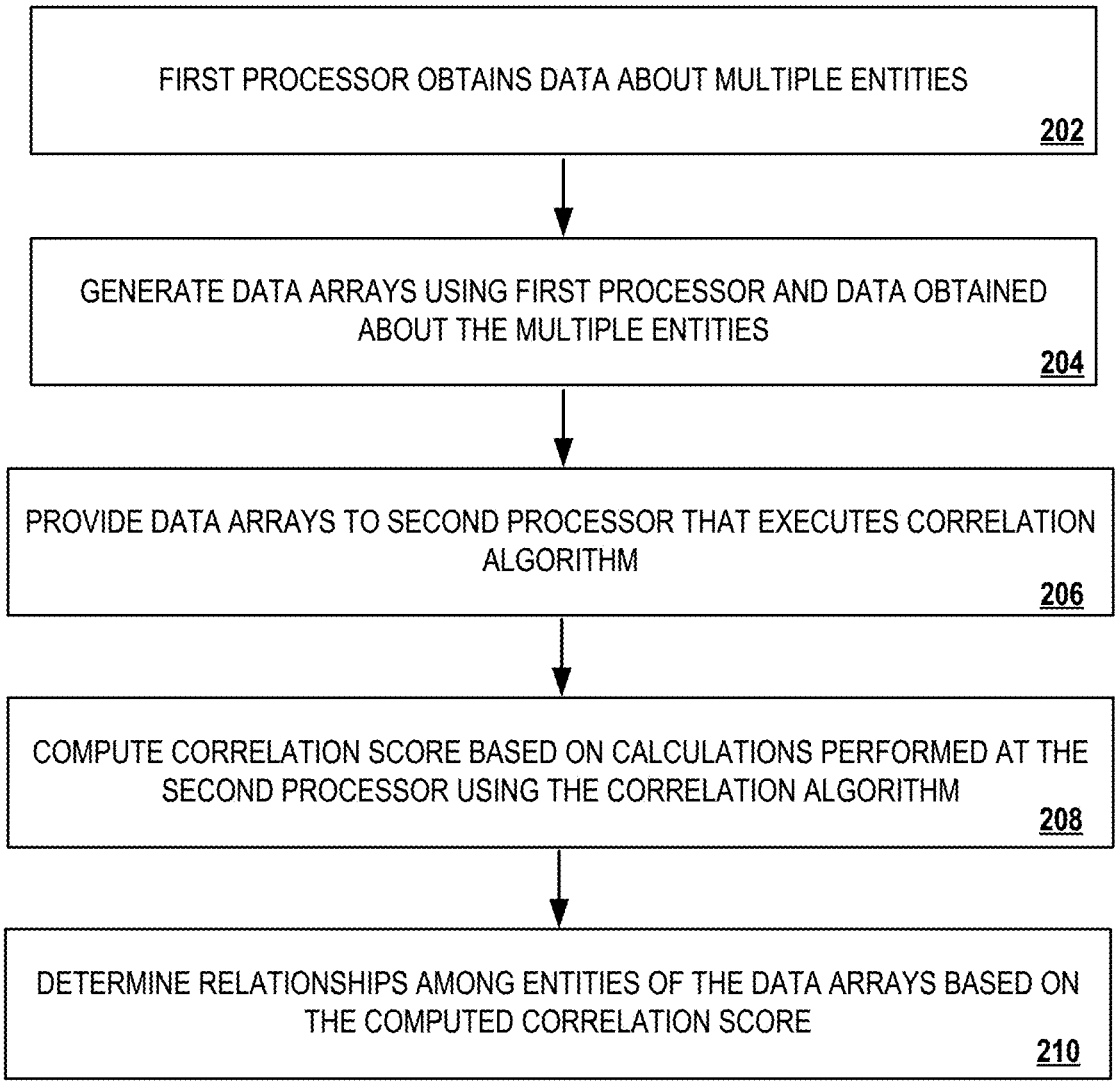
FIG. 2 is a flowchart of an example process for determining correlations among entities.

FIG. 2 is a flowchart of an example process 200 for determining correlations among entities of respective data arrays. For example, process 200 can be a process flow for calculating similarities among entities using a similarity algorithm executed at GPU 116. Process 200 can be implemented or executed using system 100 described above and descriptions of process 200 may reference the above-mentioned computing resources of system 100. In some implementations, described actions of process 200 are enabled by programmed software instructions that are executable by at least one processor and memory of computing systems described in this document.

Referring now to process 200, a first processing unit (e.g., a CPU) 116 of system 100 obtains data stored at storage device 106. The obtained data includes information about multiple entities (202). For example, entities of one data array can be represented by a dataset that includes different types of items, persons, or various electronic and real world items or objects. For example, entities of one dataset (data array) can be persons or users of a particular population group (e.g., males in their 20's) that reside in a certain geographic region (e.g., the United Kingdom (U.K.)). Similarly, entities of another dataset can be various types of items or users of another demographic (e.g., users of a general population) that also reside in the same geographic region.

Processing unit/CPU 116 generates multiple data arrays 306 using the data obtained from a storage device (204). Each generated data array 308, 310, 312 of the multiple data arrays 306 generally includes one or more parameter values for each entity of the multiple entities assigned to the data array. That is, "Entity_1,1" in the DataArray_1 308 in FIG. 3 can denote one or more parameter values for a first entity of the multiple entities in DataArray_1, "Entity_1,2" in the DataArray_1 308 in FIG. 3 denotes one or more parameter values for a second entity, and so on. The parameter values can define particular types of entities as well as define attributes or characteristics of individual entities in a data array. For example, parameter values can define an entity type as corresponding to a person, where attributes of the person (e.g., the entity) include information that the person has provided, such as the person's gender, the person's age, or the person's geographic location. In some implementations, an entity type can correspond to a web-based or digital resource (e.g., the entity) and attributes of the web-based resource/entity can be a domain name, a uniform resource locator (URL), or an internet protocol (IP) address associated with the web-based entity.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

System 100 is configured to analyze and process different sources of data accessible via storage device 106. For example, CPU 116 can analyze and process data sources that include impression logs that are interacted with by certain users or data sources such as search data from a search engine accessed by different users. In some implementations, entities formed by groups of users, or by groups of user identifiers (IDs) for respective users, can be divided into different groups based on age, gender, interests, location, or other characteristics of each user in the group.

The KMV algorithm can represent an example hash algorithm that is processed using information about each user or each user ID in a group of entities. In some implementations, multiple sets of user IDs are represented as large parameter values that function as an emitter for pre-sorting data to generate the data arrays. For example, pre-sorting the data is done using a hash algorithm that hashes arbitrary strings of integers to a uniformly distributed emitter to generate the data arrays. So, for an example use case, CPU 116 executes the KMV algorithm to sort on user IDs in order to generate a sketch that is representative of some predefined whole user set. For example, from a whole user set of ten million user IDs males between the age of 18 and 35 that interact with sports related impressions, CPU 116 can perform a sort to generate a sketch or data array of only the minimum 64,000 user IDs as a sketch representation of the whole user set. In some implementations, rather than sorting with reference to user IDs, system 100 can be configured to sort information in a dataset with reference to any attribute or parameter value that is included in the information.

Each of the generated data arrays is configured for processing at a respective computing cell of a second processing unit (e.g., a GPU) 118. System 100 provides at least two data arrays to GPU 118 to compute scoring data and to determine relationships among entities of the data arrays based on the computed scoring data (206). For example, sketches are loaded into memory of GPU 118 in a single instance for at least one query session. The query session represents a time at which the entity correlation system 104 is queried by a user seeking to obtain result sets that indicate relationships between entities of the sketches. Hence, at query time, responses to a query submitted by a user can be determined with enhanced speed and efficiency relative to other correlation systems because the system has already pre-sorted and pre-loaded data that is used to process the query. In some implementations, at any given moment, a user can access and randomly query system 104 by passing a new sketch as a query to system 104 via the query path.

GPU 118 is configured to execute a correlation algorithm to concurrently process the data arrays at the respective cells of the GPU 118. For example, processing unit 118 computes one or more correlation scores based on calculations performed at the respective computing cells (208). Specifically, GPU 118 executes the correlation algorithm (e.g., a jaccard similarity algorithm) and computes correlation scores using parameter values for entities in the data arrays. The parameter values are provided as inputs for mathematical calculations involving the correlation algorithm. System 100 determines relationships among entities of the at least two data arrays based on the computed correlation scores (210). In some implementations, the relationships indicate overlapping attributes among at least a subset of the entities or similarities among entities of respective data arrays. For example, system 100 determines similarities among entities by computing intersections and unions at a single computing cell of GPU 118 and corresponding correlation scores that characterize the intersections and unions.

To further illustrate the scoring and determination of relationships, during a run time operating scenario, hosting service 110 interfaces with GPU 118 to pass a new sketch as a query tensor for processing to determine a result that is responsive to the query. For example, users can access system 100 where hosting service 110 is part of a real-time service platform that provides a response (e.g., in real-time) to a user query. In some implementations, a user submits a query for processing by GPU 118 in real-time, using an interface to GPU 118 provided via hosting service 110. GPU 118 processes the query using the techniques described this document to return a result, or sets of results, as a response to the query submitted by the user. GPU 118 executes the correlation algorithm to compute the intersection and union of the user query with every data array for a given set (or dataset) within the database.

For example, portions of a large-scale computation to determine intersections and unions and corresponding correlation scores are handled at individual computing cells of GPU 118. The query is processed against data structures that represent sketches or data arrays loaded at each computing cell (e.g., a thread or core) of GPU 118. System 104 processes the query by performing large-scale parallel computations which can involve every computing cell in the GPU being used to process the query against a respective one of the data structures. Stated another way, the respective one of the data structures can represent a different data array of entities that is loaded for processing at a single GPU computing cell. For example, a first sketch having 64 k user IDs for females (first entities) of a certain age group living in the U.S. can be loaded at a first computing cell so the query can be processed against the first entities of this first sketch. Likewise, a second sketch having 64 k user IDs for males (second entities) of a certain age group living in the U.K. can be loaded at a second different computing cell so the query can be processed against the second entities of this second sketch.

In some implementations, hosting service 110 represents an information library that receives and processes queries to return results that indicate relationships such as similarities between entities or conditional probabilities involving different sets of entities. For example, a query (or command) can be "what are all the conditional probabilities associated with some earlier query?" Another query may be related to the conditional probabilities of all the ages of people that visit a particular website or URL. Similarly, another query can be "what are the overlapping URL's visited by 30-year-old females living in the U.S. relative to 40-year-old males living in the U.K.?" For a given query, system 100 may compute intersections and unions to determine relationships among entities of the first data array vs. entities of the second data array and against a query sketch generated based on the user submitted query.

For example, system 100 can compute the intersections and unions to determine relationships by using respective computing cells of GPU 118 to execute a jaccard similarity algorithm. In some implementations, the executed algorithm is used to determine a similarity score that indicates a respective measure of similarity between entities of data structures processed at respective computing cells of GPU 118 relative to constraints indicated by a query. System 104 uses GPU 118 to computes a jaccard similarity (or correlation) score based on a comparison of entities included in at least two sets or data arrays. For example, the jaccard similarity score can provide a numerical indication of which entities are shared between the two sets and which entities are distinct between the two sets. In some implementations, the jaccard similarity score provides a measure of similarity for two sets of data, with a range from 0% to 100%. For example, the higher the percentage, the more similar the two sets of entities. In general, a correlation score can be a similarity score, a conditional probability, a metric indicating a statistical relationship, or a particular output parameter that defines rankings of interest for providing results to a user query.

GPU 118 can be configured to execute the following commands i) through iv). These commands can represent a specific set of computer-implemented rules for determining relationships among entities of data arrays:

i) tf.sketch_gpu_load_table (query_tensor)
ii) tf.sketch_gpu_load_table (GPU_table_uri)
iii) tf.sketch_gpu_method (simlarity_method_enum)
  →$J(X,Y)=|X \cap Y|/|X \cup Y|$ (formula_similarity_score)
iv) tf.sketch_gpu_results (top_k_return)

In response to executing these commands, system 104 returns the top k similar results of the query tensor, based on a specific similarity method, and using entity data that is pre-loaded and specified by GPU_table_uri. In some implementations, a query_tensor can be a vector (e.g., a high dimension vector) that represents a query entity in a vectorized manner. GPU_table_uri can specify a table type and table name (e.g., sstable a1_inmarket_profile), where this table is pre-loaded in GPU 118 using the load command tf.sketch_gpu_load_table. Simlarity_method_enum can specify a selected similarity calculation method. In some implementations, the selected similarity calculation method can be a method such as jaccard similarity method or cosine similarity method.

With reference to intersections and unions, system 100 can calculate a size of an intersection of any two sets (entities of two different arrays/sketches) and the ratio of the intersection and union with reference to general set operations. These calculations provide a fundamental baseline upon which a variety of other computing processes can be built. In this context, system 100 can determine multiple types of statistical relationships between sets of entities using data obtained from various sources of information. For example, jaccard similarity is one statistical relationship that can be determined, while probabilities (e.g., conditional probabilities) indicate another statistical relationship. In general, any related statistic can be computed over cardinalities of sets based on the described teachings.

System 104 can be configured to select a particular correlation algorithm from among a subset of algorithms. The algorithm can be selected as one of a similarity algorithm or a conditional probability algorithm. GPU 118 executes the particular correlation algorithm and calculates an intersection between entities of at least two data arrays and a union between entities of the at least two data arrays. System 104 computes the correlation score based on the intersection and the union. In some implementations, the selected correlation algorithm is a jaccard similarity algorithm, a cosine similarity algorithm, a unique statistical algorithm, or a specific computational process for determining conditional probabilities among sets of data.

Figure 3:
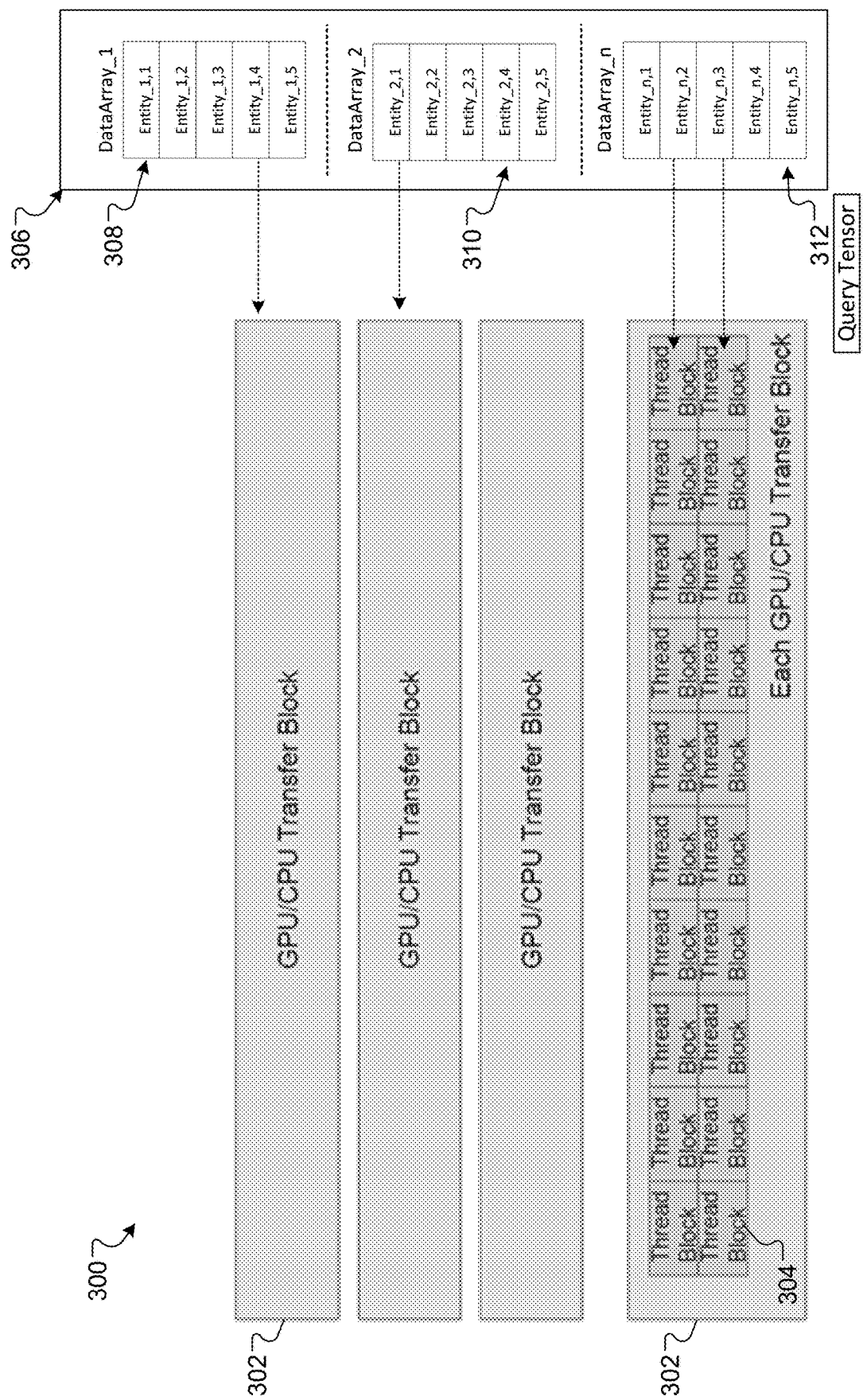
FIG. 3 is an example architecture associated with at least one processor in the computing system of FIG. 1.

FIG. 3 is an example architecture 300 associated with at least one processor in the computing system of FIG. 1. Architecture 300 includes GPU/CPU transfer block 302 and respective data arrays 308, 310, and 312. In some implementations, data array 312 is a query tensor that is generated based on a user query received via ingest component 108. As described in more detail below, query tensor 312 is processed to determine a result that is responsive to the received query. As indicated above, each of the generated data arrays 308, 310, 312 is received generated using CPU 116 and loaded at GPU 118 using transfer block 302. In particular, each of the data arrays 308, 310, 312 is configured for processing at a respective computing cell of GPU 118. System 100 uses transfer block 302 and compact memory (e.g., GPU cache) to load and store data describing the various pre-sorted entities of a data array.

For example, the entities of at least data arrays 308 and 310 can be users of a particular demographic (e.g., males in their 20's) that reside in a certain geographic region (e.g., the United Kingdom (UK)). The correlation calculation is performed using at least the sets of pre-sorted entities in respective data arrays 308 and 310 that are stored at a compact memory of GPU 118. The data arrays are configured for storage in a compact memory or data cache of GPU 118 based on a predefined size and data structure of the data arrays. For example, the predefined size can be set such that each data array includes no more than 64,000 ("64 k") entities. In some implementations, this predefined size attribute of the respective data arrays can be derived based on a processor core structure of GPU 118.

Execution of the correlation algorithm to perform the computations causes large scale concurrent processing (e.g., massively parallel computations) to occur within GPU 118. For example, concurrent processing can involve subsets of computing cells (thread blocks 304) in one or more transfer blocks 302. Computations can be considered "large scale concurrent processing" or "massively parallel" when the computations use more than a threshold percentage of all computing cells in GPU 118. For example, massively parallel computations can use more than 70% of the available computing cells in GPU 118 (or some other appropriate threshold amount). Groups of threads (thread blocks) can be configured for both serial and parallel execution. In some implementations, GPU 118 includes thousands of computing cells or threads of thread blocks 304. As used herein, a computing cell of GPU 118 is defined by a thread block that represents a group of threads. As indicated at FIG. 3 (described below), each thread block can be mapped to a corresponding transfer block 302. In some implementations, system 100 includes multiple transfer blocks and each transfer block defines a transfer path where CPU generated sketches are transferred for loading at computing cells of a thread block 304.

Figure 4:
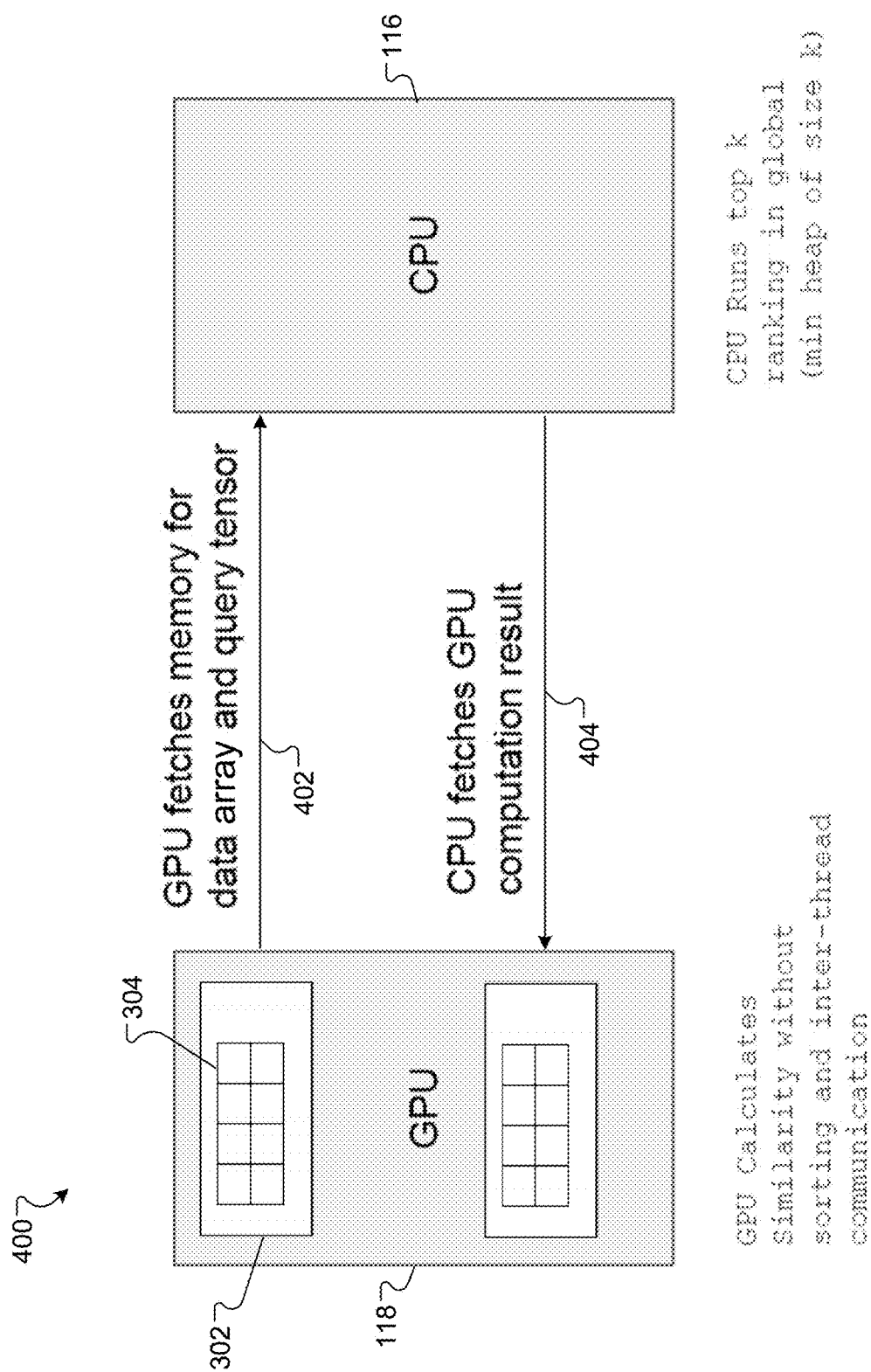
FIG. 4 is another example architecture associated with the at least one processor in the computing system of FIG. 1.

FIG. 4 is an example processing architecture 400 associated with computing processes involving CPU 116 and GPU 118. Each data array loaded and stored at a respective thread block 304 (that includes multiple computing cells) of GPU 118 is sized in accordance with a quantity of computing cells that are included at the graphics processor. In some implementations, system 104 executes a process 402 that causes GPU 118 to fetch storage locations for loading and storing each data array at a memory cache of the GPU. The memory cache of GPU 118 can represent a compact memory and each data array is sized in accordance with a data capacity of the storage locations in the compact memory. At least one data array loaded at GPU 118 is a query tensor (e.g., data array 312) that is configured for access at each of the computing cells of GPU 118. For example, the query tensor is replicated and is accessed in parallel at GPU 118 to compute relationships (e.g., similarities) among entities of respective data arrays. Each computing cell accesses and uses query information of the query tensor to calculate a respective correlation score at each cell.

System 104 determines similarities and other relationships among entities of distinct data arrays when at least two data arrays are concurrently processed against the query tensor in a parallel manner at GPU 118. Specifically, architecture 400 can be used to implement techniques for accelerating data calculations to determine similarities and other relationships among entities. For example, the techniques can involve configuring the pre-sorted data arrays to have a size attribute (e.g., 64 k) that does not exceed a memory threshold of GPU 118. The techniques can also involve storing the data arrays at GPU 118 and assigning each data array to a particular computing cell of GPU 118. System 104 can determine an assignment of each data array to a computing cell so that the cell can quickly access relevant data to determine relationships among entities.

In some implementations, system 104 executes a process 404 that causes CPU 116 to fetch computation results produced by GPU 118. For example, CPU 116 obtains correlation scores that represent the computation results and processes the results to generate query responses that are provided for output to the user that submitted the query. In some implementations, determining relationships among entities includes determining whether computed correlation scores exceed a threshold score. In response to determining that the computed correlation scores exceed the threshold score, system 104 generates a listing of entities that are ranked using the correlation scores that exceed the threshold score.

In some implementations, system 104 returns results of the computations performed at GPU 118 to CPU 116 by returning information that identifies one or more data arrays that are n best matches to the query. For example, system 104 determines then best matches to the query using correlation scores that are calculated when the data arrays are processed against the query tensor at the respective computing cells. In some implementations, data structures that are n best matches to the query are included in the generated listing of entities that are ranked using the correlation scores that exceed the threshold correlation score. Hence, data arrays that are n best matches to the query can be identified based on analysis of the generated listing of ranked entities.

In some implementations, GPU 118 determines scores, computation results, and/or relationships among entities with increased speed relative to other correlation systems. This is because the described techniques enable GPU 118 to perform the necessary calculations without sorting/pre-sorting data before executing a particular correlation algorithm. Additionally, GPU 118 can perform the necessary calculations with minimal, or no, inter-thread data communication relative to other correlation systems. This is because the described techniques enable each computing cell of GPU 118 to perform computations on specific sets of data arrays without the need to communicate intermediate results to neighboring thread blocks for additional processing.

Figure 5:
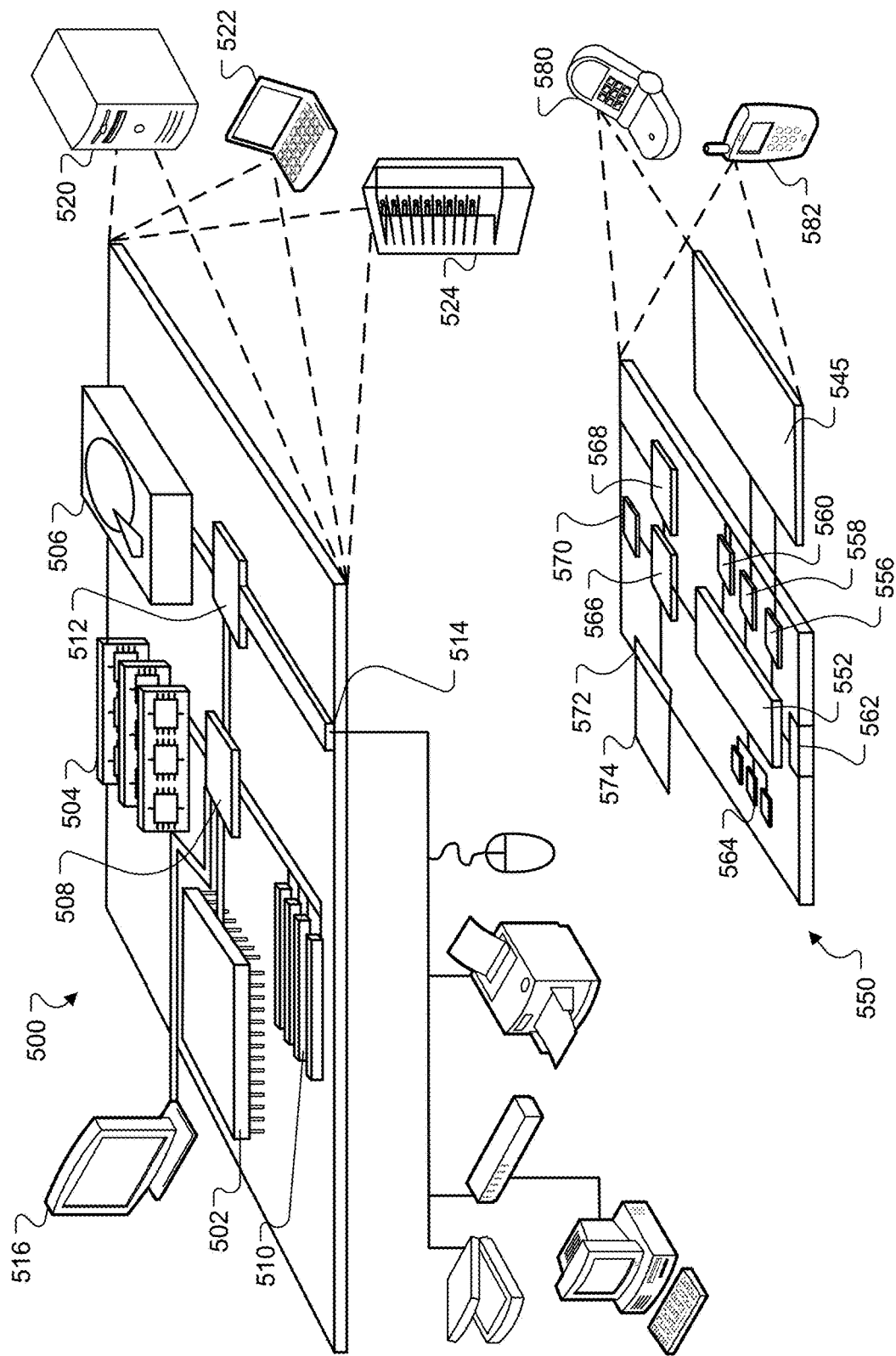
FIG. 5 is a block diagram of a computing system that can be used in connection with methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A method comprising:
receiving first data items at a first processing unit;
generating, by the first processing unit and from at least the first data items, data structures, each data structure representing a respective dataset corresponding to at least a portion of the first data items;
storing the data structures in a memory of a second processing unit;
receiving, at the first processing unit, a query from an injest component communicatively coupled to the first processing unit;
generating, by the first processing unit and from the received query, a query data structure including data representing a set of second data items;
processing concurrently, by the second processing unit, the query data structure against two or more of the data structures stored in the memory of the second processing unit, the processing comprising: for each of the two or more of the data structures, computing, by the second processing unit, a correlation score for the query data structure and the data structure according to a correlation algorithm; and
returning results corresponding to the query determined based on the computed correlation scores from the second processing unit to the first processing unit.

2. The method of claim 1, wherein the second processing unit comprises multiple processing cores, and processing, by the second processing unit, the query data structure against the two or more of the data structures comprises: processing the query data structure concurrently in each processing core against a respective one of the two or more of the data structures.

3. The method of claim 1, wherein returning the results from the second processing unit to the first processing unit comprises returning, based on the computed correlation scores, information identifying data structures that are the top N matches to the query, wherein Nis an integer.

4. The method of claim 1, wherein before returning the results, the method further comprises: determining relationships among the second set of data items of the query data structure and the respective datasets in the two or more of the data structures based on the correlation scores, wherein the relationships indicate overlapping attributes that exist among at least a subset of the respective datasets.

5. The method of claim 1, wherein the data structures and the query data structure are KMV sketches.

6. The method of claim 1, wherein for each data structure of the two or more of the data structures, computing the correlation score for the query data structure and the data structure comprises:
selecting, as the correlation algorithm, a similarity algorithm or a conditional probability algorithm;
calculating, using the correlation algorithm, (i) an intersection between the set of second data items of the query data structure and the respective dataset of the data structure and (ii) a union between the set of second data items of the query data structure and the respective dataset of the data structure; and
computing the correlation score, for the query data structure and the data structure, based on the intersection and the union.

7. The method of claim 1, wherein:
the first processing unit is a central processing unit (CPU) that pre-sorts the first data items to generate the data structures; and
the second processing unit is a graphics processing unit (GPU) that performs parallel calculations for data items of the query data structure and the data structures.

8. The method of claim 1, wherein the query data structure is configured for access by each of a plurality of computing cells that are included at the second processing unit.

9. The method of claim 1, wherein processing, by the second processing unit, the query data structure against a data structure stored in the memory of the second processing unit comprises determining the union of the second data items in the query data structure and the respective dataset in the data structure.

10. The method of claim 1, wherein processing, by the second processing unit, the query data structure against a data structure stored in the memory of the second processing unit comprises determining the intersection of the second data items in the query data structure and the respective dataset in the data structure.

11. The method of claim 1, wherein processing, by the second processing unit, the query data structure against a data structure stored in the memory of the second processing unit comprises determining the Jaccard similarity between the query data structure and the data structure.

12. The method of claim 1, wherein:
receiving the first data items at the first processing unit comprises receiving the first data items from a data hosting service; and the method further comprises:
returning the results corresponding to the query from the first processing unit to the data hosting service.

13. The method of claim 12, further comprising:

receiving, at the first processing unit, a second query;

generating, by the first processing unit and from the received second query, a second query data structure including data representing another set of second data items; and processing, by the second processing unit, the second query data structure against the two or more of the data structures stored in the memory of the second processing unit.

14. The method of claim 13, further comprising:

receiving third data items at the first processing unit;

generating, by the first processing unit and from at least the received third data items, updated data structures, each updated data structure representing a respective dataset corresponding to at least a portion of the third data items; and storing the updated data structures in the memory of the second processing unit.

15. The method of claim 14, further comprising:

receiving, at the first processing unit, a third query;

generating, by the first processing unit and from the received third query, a third query data structure including data representing a further set of second data items; and processing, by the second processing unit, the third query data structure against the updated data structures stored in the memory of the second processing unit.

16. The method of claim 1, wherein:

each data structure of the data structures is sized according to a quantity of computing cells that are included at the second processing unit.

17. The method of claim 1, wherein storing the data structures in the memory of the second processing unit comprises:

storing the data structures at a memory cache of the second processing unit, wherein the memory cache represents a compact memory of the second processing unit and each data structure is sized according to data capacity of the compact memory.

18. An electronic system comprising:

one or more processing devices; and one or more non-transitory machine-readable storage devices storing instructions that are executable by the a plurality of processing devices including a first processing unit and a second processing unit to cause performance of operations, the operations comprising:

receiving first data items at the first processing unit;

generating, by the first processing unit and from at least the first data items, data structures, each data structure representing a respective dataset corresponding to at least a portion of the first data items; storing the data structures in a memory of the second processing unit;

receiving, at the first processing unit, a query from an injest component communicatively coupled to the first processing unit;

generating, by the first processing unit and from the received query, a query data structure including data representing a set of second data items;

processing concurrently, by the second processing unit, the query data structure against two or more of the data structures stored in the memory of the second processing unit, the processing comprising: for each of the two or more of the data structures, computing, by the second processing unit, a correlation score for the query data structure and the data structure according to a correlation algorithm; and returning results corresponding to the query determined based on the computed correlation scores from the second processing unit to the first processing unit.

19. The electronic system of claim 18, wherein the second processing unit comprises multiple processing cores, and processing, by the second processing unit, the query data structure against the two or more of the data structures comprises:

processing the query data structure concurrently in each processing core against a respective one of the two or more of the data structures.

20. The electronic system of claim 18, wherein returning the results from the second processing unit to the first processing unit comprises returning, based on the computed correlation scores, information identifying data structures that are the top N matches to the query, wherein N is an integer.

* * * * *